(12) United States Patent
Takahashi

(10) Patent No.: US 12,296,753 B2
(45) Date of Patent: *May 13, 2025

(54) DISPLAY PANEL INCLUDING A DISPLAY UNIT

(71) Applicant: TOYODA GOSEI CO., LTD., Kiyosu (JP)

(72) Inventor: Kazuhisa Takahashi, Kiyosu (JP)

(73) Assignee: TOYODA GOSEI CO., LTD., Kiyosu (JP)

(*) Notice: Subject to any disclaimer, the term of this patent is extended or adjusted under 35 U.S.C. 154(b) by 0 days.

This patent is subject to a terminal disclaimer.

(21) Appl. No.: 18/592,462

(22) Filed: Feb. 29, 2024

(65) Prior Publication Data

US 2024/0253578 A1 Aug. 1, 2024

Related U.S. Application Data

(63) Continuation of application No. 16/919,612, filed on Jul. 2, 2020, now Pat. No. 11,945,372.

(30) Foreign Application Priority Data

Jul. 17, 2019 (JP) ................. 2019-131821

(51) Int. Cl.
*B60R 13/04* (2006.01)
*B60R 11/02* (2006.01)
(Continued)

(52) U.S. Cl.
CPC ........ *B60R 11/0235* (2013.01); *B60R 13/005* (2013.01); *G01S 7/04* (2013.01);
(Continued)

(58) Field of Classification Search
CPC ................................................. B60R 21/0134
See application file for complete search history.

(56) References Cited

U.S. PATENT DOCUMENTS 9,533,627 B2 1/2017 Sugiura et al.
11,945,372 B2 * 4/2024 Takahashi ............. G01S 13/931
(Continued)

FOREIGN PATENT DOCUMENTS

CN 107176110 A 9/2017
CN 109311433 A 2/2019
(Continued)

OTHER PUBLICATIONS

Japanese Office Action, dated Jun. 14, 2022, in Japanese Application No. 2019-131821 and English Translation thereof.
(Continued)

*Primary Examiner* — Anthony Q Edwards
(74) *Attorney, Agent, or Firm* — MCGINN I.P. LAW GROUP, PLLC

(57) ABSTRACT

A display panel is employed in a vehicle equipped with an external situation recognizing device that is configured to receive electromagnetic waves from outside to recognize an external situation. The external situation recognizing device is located at an end in a front-rear direction of the vehicle. The display panel is provided at the end of the vehicle and extends in a direction intersecting with the front-rear direction of the vehicle. The display panel includes a display unit and a cover unit that is closer to an outside of the vehicle than the external situation recognizing device and is located at a position that corresponds to the external situation recognizing device. The cover unit is configured to allow the external situation recognizing device to receive the electromagnetic waves from outside through the cover unit. The display unit is located to be adjacent to the cover unit.

4 Claims, 1 Drawing Sheet

(51) Int. Cl.
*B60R 13/00* (2006.01)
*G01S 7/04* (2006.01)
*G01S 13/931* (2020.01)

(52) U.S. Cl.
CPC ....... *G01S 13/931* (2013.01); *B60R 2300/301* (2013.01); *G01S 2013/93271* (2020.01)

(56) References Cited

U.S. PATENT DOCUMENTS

| | | |
|---|---|---|
| 2015/0076851 A1 | 3/2015 | Sugiura et al. |
| 2017/0259754 A1 | 9/2017 | Gong |
| 2018/0088230 A1 | 3/2018 | Hung et al. |
| 2019/0197927 A1 | 6/2019 | Matsuoka et al. |
| 2019/0213931 A1 | 7/2019 | Brubaker |
| 2019/0235050 A1 | 8/2019 | Maligeorgos et al. |
| 2020/0096612 A1 | 3/2020 | Otoyo et al. |
| 2020/0124701 A1 | 4/2020 | Takahashi et al. |
| 2020/0132802 A1 | 4/2020 | Wohlte |
| 2020/0191952 A1 | 6/2020 | Makinen et al. |

FOREIGN PATENT DOCUMENTS

| | | |
|---|---|---|
| JP | 2017-091321 A | 5/2017 |
| JP | 6477856 B1 | 3/2019 |

OTHER PUBLICATIONS

Chinese Office Action dated Dec. 21, 2021, in Chinese Application No. 202010669456.2 and English Translation thereof.
United States Office Action dated Jun. 15, 2023, in co-pending U.S. Appl. No. 16/919,612.
United States Office Action dated Sep. 1, 2023, in co-pending U.S. Appl. No. 16/919,612.
United States Notice of Allowance dated Dec. 11, 2023, in co-pending U.S. Appl. No. 16/919,612.

* cited by examiner

DISPLAY PANEL INCLUDING A DISPLAY UNIT

CROSS-REFERENCE TO RELATED APPLICATIONS

The present application is a Continuation Application of U.S. patent application Ser. No. 16/919,612, filed on Jul. 2, 2020, which is based upon and claims the benefit of priority from Japanese Patent Application No. 2019-131821, filed on Jul. 17, 2019, the entire contents of which are incorporated herein by reference.

BACKGROUND

1. Field

The present disclosure relates to a display panel.

2. Description of Related Art

As disclosed in Japanese Patent No. 6477856, a configuration has been proposed in which a display panel is provided at either end in a front-rear direction of a vehicle such as an automobile. Such a display panel is disposed to extend in a direction intersecting with the front-rear direction of the vehicle (for example, a direction orthogonal to the front-rear direction of the vehicle) and includes a display unit that is configured to display an image (a still image or a video) such as an advertisement. In some cases, a vehicle is provided with an external situation recognizing device that is configured to receive electromagnetic waves from the outside to recognize the external situation. Such an external situation recognizing device may be a millimeter wave radar, an infrared sensor, or a camera.

A millimeter wave radar is configured to transmit radio waves (millimeter waves) to the outside of the vehicle and receive the radio waves, which have hit and been reflected by an object outside the vehicle (reflected waves). The millimeter wave radar is also configured to recognize the situation outside the vehicle through such transmission and reception of the radio waves. An infrared sensor is configured to transmit infrared rays to the outside of the vehicle and receive the infrared rays, which have hit and been reflected by an object outside the vehicle. The infrared sensor is also configured to recognize the situation outside the vehicle through such transmission and reception of the infrared rays. A camera is configured to receive visible light from outside the vehicle and recognize the situation outside the vehicle based on images obtained from the visible light.

At an end in the front-rear direction of a vehicle, a display panel is disposed in a position where the display unit of the display panel is easy to see from outside the vehicle. Also, an external situation recognizing device is disposed in a position where the device is difficult to see from outside the vehicle but is allowed to readily recognize the situation outside the vehicle. In this case, the external situation recognizing device and the display unit of the display panel may overlap with each other in the front-rear direction of the vehicle. Specifically, the external situation recognizing device may be disposed on the back side of the display unit of the display panel in the front-rear direction of the vehicle. In such a configuration, electromagnetic waves toward the external situation recognizing device from outside the vehicle interfere with the display unit of the display panel. The external situation recognizing device thus cannot accurately recognize the situation outside the vehicle based on the electromagnetic waves.

To avoid the above-described drawback, one of the external situation recognizing device and the display panel may be displaced with respect to the other. This configuration inevitably reduces the function of the displaced one of the external situation recognizing device and the display panel. That is, if the external situation recognizing device is displaced, the function of recognizing the external situation of the vehicle is reduced. On the other hand, if the display panel is displaced, the function of allowing the display unit to be easy to see from outside the vehicle is reduced.

SUMMARY

Accordingly, it is an objective of the present disclosure to provide a display panel that allows a display unit to be easy to see from outside a vehicle without reducing a function of an external situation recognizing device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

To achieve the foregoing objective, a display panel is provided that is employed in a vehicle equipped with an external situation recognizing device that is configured to receive electromagnetic waves from outside to recognize an external situation. The external situation recognizing device is located at an end in a front-rear direction of the vehicle. The display panel is provided at the end of the vehicle and extends in a direction intersecting with the front-rear direction of the vehicle. The display panel includes a display unit that is configured to display an image and a cover unit that is closer to an outside of the vehicle than the external situation recognizing device and is located at a position that corresponds to the external situation recognizing device. The cover unit is configured to allow the external situation recognizing device to receive the electromagnetic waves from outside through the cover unit. The display unit is located to be adjacent to the cover unit.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

A display panel 2 according to an embodiment will now be described with reference to FIGS. 1 to 2B.

Figure 1:
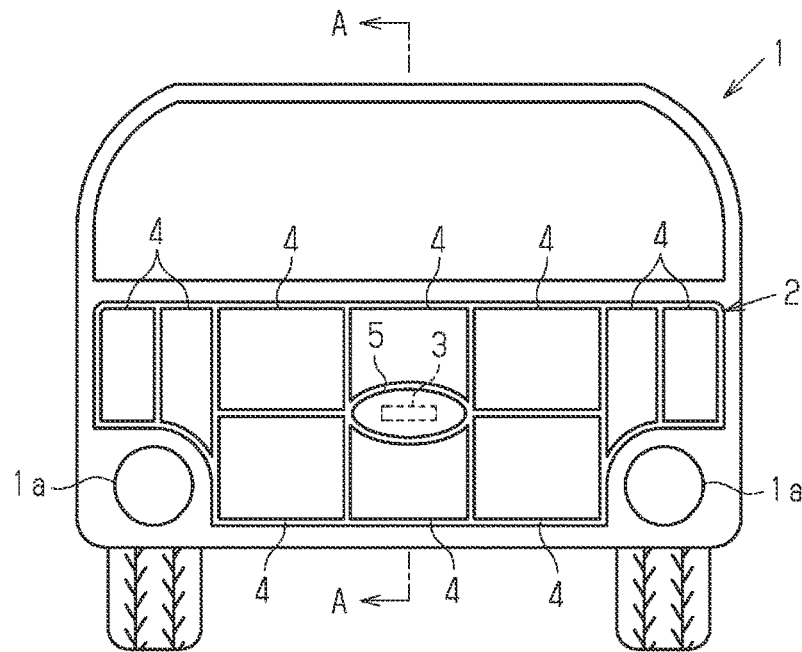
FIG. 1 is a front view of a vehicle in which a display panel is employed.

FIG. 1 illustrates a front end of a vehicle 1 as viewed from the front. The vehicle 1 includes the display panel 2 that covers the front surface of the vehicle 1. The display panel 2 extends in a direction intersecting with the front-rear direction of the vehicle 1 (the direction orthogonal to the sheet of FIG. 1). The display panel 2 extends, for example, in a direction orthogonal to the front-rear direction of the vehicle 1. The display panel 2 is shaped to avoid headlights 1a of the vehicle 1. Specifically, sections of the outer edge of the display panel 2 that correspond to the headlights 1a are curved in correspondence with the outer edges of the headlights 1a.

The vehicle 1 includes a millimeter wave radar 3, which is disposed on the back side of the display panel 2 at the front end of the vehicle 1. In other words, the millimeter wave radar 3 is closer to the rear side of the vehicle 1 than the display panel 2. The millimeter wave radar 3 is located at the center in the width direction of the vehicle 1 (in the lateral direction in FIG. 1). The millimeter wave radar 3 is configured to transmit radio waves (millimeter waves) forward from the vehicle 1 and receive the radio waves, which have hit and been reflected by an object outside the vehicle 1 (reflected waves). The millimeter wave radar 3 is also configured to recognize the situation outside the vehicle through such transmission and reception of the radio waves. The millimeter wave radar 3 functions as an external situation recognizing device that is configured to receive electromagnetic waves from outside the vehicle to recognize the external situation.

The display panel 2 is provided with a decorated ornament (an emblem in the present embodiment) 5 disposed in a section that corresponds to the millimeter wave radar 3. The ornament 5 is made of a material that allows for passage of millimeter waves that are transmitted and received by the millimeter wave radar 3 (for example, polycarbonate). That is, the ornament 5 has a millimeter wave transparency. This allows the millimeter wave radar 3 to receive millimeter waves (reflected waves) from outside the vehicle 1 through the ornament 5. The ornament 5 functions as a cover unit that is closer to the outside of the vehicle 1 (the front side of the vehicle 1) than the external situation recognizing device (the millimeter wave radar 3) and is located at a position that corresponds to the external situation recognizing device.

The display panel 2 includes multiple display units 4 that are configured to display images such as advertisements. The display units 4 may be LED displays.

Some of the display units 4 are arranged to be adjacent to the ornament 5 and to surround the ornament 5. Specifically, the ornament 5 has an oval shape. Each of the display units 4 that surround the ornament 5 is shaped such that the section of the outer edge corresponding to the outer periphery of the ornament 5 is shaped in correspondence with the outer periphery of the ornament 5. A slight clearance exists between the outer periphery of the ornament 5 and the section of the outer edge of the display unit 4 corresponding to the outer periphery of the ornament 5. Some of the display units 4 are arranged to be adjacent to the headlights 1a. The display units 4 that are adjacent to the headlight 1a have outer edges shaped in correspondence with the outer edge of the headlight 1a.

The display units 4 of the display panel 2 will now be described.

Figure 2A:
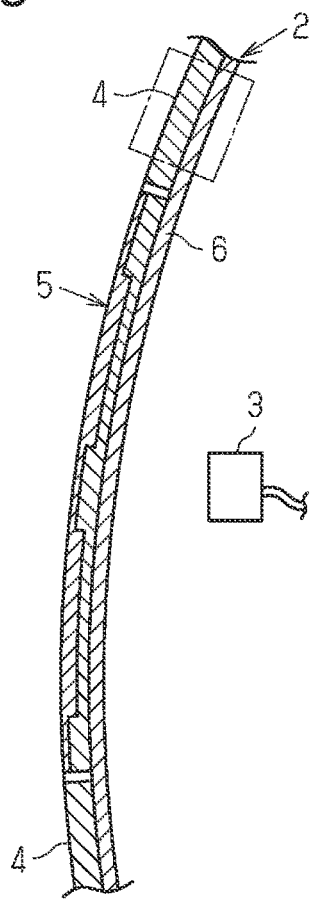
FIG. 2A is a cross-sectional view taken along line A-A of FIG. 1, illustrating an ornament and a display unit provided about the ornament in the display panel.

FIG. 2A is a cross-sectional view taken along line A-A of FIG. 1 and shows the ornament 5 and the display units 4 that are located about the ornament 5 in the display panel 2. As shown in FIG. 2A, the display panel 2 includes a panel base 6. The panel base 6 is made of a material that allows millimeter waves to pass through (for example, polycarbonate). That is, the panel base 6 has a millimeter wave transparency. The panel base 6 is curved to have an arcuate shape to protrude forward (leftward as viewed in FIG. 2A) of the vehicle 1. The ornament 5 and the display units 4 are fixed to the surface of the panel base 6 closer to the front side of the vehicle 1 (the surface on the left side as viewed in FIG. 2A).

The millimeter wave radar 3 is located closer to the rear side of the vehicle 1 than the display panel 2 (on the right side as viewed in FIG. 2A). The millimeter wave radar 3 transmits millimeter waves forward from the vehicle 1 and receives the millimeter waves, which have hit and been reflected by an object located in front of the vehicle 1. The millimeter wave radar 3 recognizes the external situation in front of the vehicle 1, for example, whether there is an object, through such transmission and reception of the millimeter waves. The ornament 5 and the panel base 6, which are located closer to the front side of the vehicle 1 than the millimeter wave radar 3, are made of a material that allows millimeter waves to pass through. Thus, transmission and reception of the millimeter waves by the millimeter wave radar 3 are not hampered by the ornament 5 or the panel base 6.

Figure 2B:
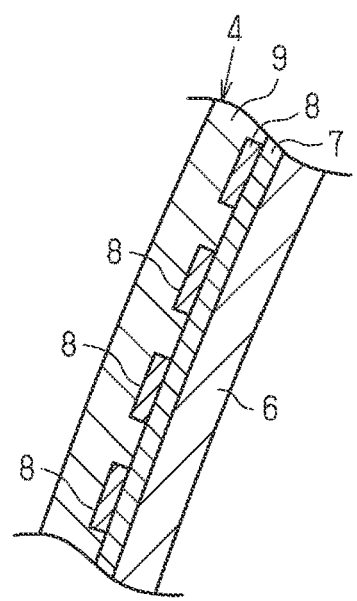
FIG. 2B is an enlarged partial cross-sectional view showing a section surrounded by the long dashed short dashed line in FIG. 2A.

FIG. 2B is an enlarged view of a section of the display unit 4 that is surrounded by the long dashed short dashed line in FIG. 2A. As shown in FIG. 2B, the display unit 4 includes a plastic substrate 7, multiple light emitting diodes (LEDs) 8, and a transparent layer 9, which is made of a transparent material. The substrate 7 is fixed to the panel base 6. The LEDs 8 are provided on the surface of the substrate 7 closer to the front side of the vehicle 1 (the surface on the left side as viewed in FIG. 2B). The transparent layer 9 is formed on the surface of the substrate 7 closer to the front side of the vehicle 1 to cover the LEDs 8.

The substrate 7 is made of thermoplastic resin such as polycarbonate or polyethylene terephthalate. The substrate 7 is heated while being caused to contact the panel base 6, so that the substrate 7 is bent to be in surface contact with the panel base 6. The substrate 7 is then fixed to the panel base 6 in a state of being shaped in correspondence with the curvature of the panel base 6. The multiple LEDs 8 are attached to the substrate 7 at predetermined intervals.

A wiring pattern made of a conductive material is formed on the substrate 7 to energize the respective LEDs 8. The wiring pattern may be made of a material prepared by mixing a conductive paste containing, for example, silver with urethane or silicone. The use of such wiring pattern allows the LEDs 8, which are provided on the curved substrate 7, to be energized through the wiring pattern.

In the display panel 2 shown in FIG. 1, energization of the respective LEDs 8 on the substrates 7 of the display units 4 (LED displays) is controlled to display images on the display units 4. The display panel 2, which has the above-described configuration, is capable of displaying images by using most of the front surface of the vehicle 1, allowing the images to be easy to see from outside the vehicle 1.

The operation of the display panel 2 will now be described.

The millimeter wave radar 3 is preferably provided at the front end and the center in the lateral direction of the vehicle 1 in order to recognize the situation outside the vehicle 1, that is, whether there is an object in front of the vehicle 1. Also, the millimeter wave radar 3 is preferably difficult to see from outside the vehicle 1 to improve the design in the outer appearance of the vehicle 1. On the other hand, when the display panel 2, which has the display units 4, is provided on the front surface of the vehicle 1, the display units 4 are preferably arranged in a wide range in the front surface of the vehicle 1 so that the display units 4 are easy to see from outside the vehicle 1.

In consideration of the above, the display panel 2 and the millimeter wave radar 3 are both provided at the front end of the vehicle 1. The display panel 2 and the millimeter wave radar 3 thus need to overlap with each other in the front-rear direction of the vehicle 1. Specifically, the millimeter wave radar 3 needs to be provided on the back side of the display panel 2. In this case, if the millimeter wave radar 3 is provided on the back side of one of the display units 4 of the display panel 2 in the front-rear direction of the vehicle 1, the electromagnetic waves that are transmitted and received by the millimeter wave radar 3 interfere with the display unit 4. The millimeter wave radar 3 thus cannot accurately recognize the situation outside the vehicle 1, that is, whether there is an object in front of the vehicle 1, based on the millimeter waves.

In order to deal with such a problem, the display panel 2 is formed in the following manner. That is, the panel base 6 is made of a material that allows millimeter waves to pass through. Further, the ornament 5, which is made a material that allows millimeter waves to pass through, is provided on a section of the display panel 2 that is closer to the front side (the outside) of the vehicle 1 than the millimeter wave radar 3 and corresponds to the millimeter wave radar 3. Also, some of the display units 4 of the display panel 2 are arranged to be adjacent to the ornament 5.

Therefore, the ornament 5 is located at the position on the display panel 2 that corresponds to the millimeter wave radar 3 even if the millimeter wave radar 3 is disposed at a position at the front end of the vehicle 1 that is suitable for recognizing the situation outside the vehicle 1, and the display panel 2 is disposed at a position where the display units 4 are easy to see from outside the vehicle 1. This allows the millimeter wave radar 3 to receive millimeter waves through the ornament 5 and the section of the panel base 6 that corresponds to the ornament 5. Also, the display panel 2 does not need to be displaced from a position where the display units 4 are easy to see in order to allow the millimeter wave radar 3 to transmit and receive millimeter waves, in other words, in order to avoid interference of the millimeter waves with the display units 4 of the display panel 2.

The present embodiment as described above has the following advantages.

(1) In order to allow the millimeter wave radar 3 to transmit and receive millimeter waves, the millimeter wave radar 3 does not need to be displaced from a position that is suitable for recognizing the situation outside the vehicle 1, or the display panel 2 does not need to be displaced from a position where the display units 4 are easy to see. This allows the display units 4 of the display panel 2 to be easy to see from outside the vehicle 1 without reducing the function of the millimeter wave radar 3.

(2) The display units 4 of the display panel 2 are arranged to surround the ornament 5. Thus, the whole area around the ornament 5 in the display panel 2 is formed by the display units 4. This increases the ratio of the display units 4 in the display panel 2. Even though the ratio of the display units 4 in the display panel 2 is increased, the display units 4 do not interfere with millimeter waves that are transmitted and received by the millimeter wave radar 3. Thus, the function of the millimeter wave radar 3 of recognizing the external situation of the vehicle 1 is not reduced.

(3) The millimeter wave radar 3 is concealed from the outside by the decorated ornament 5, which is, for example, an emblem. This improves the design of the display panel 2 in the area including the ornament 5.

The above-described embodiment may be modified as follows.

The display panel 2 does not necessarily need to be shaped to avoid headlights 1a of the vehicle 1, but may be shaped to cover the front sides of the headlights 1a. In this case, the display panel 2 may include a transparent unit in a section corresponding to each headlight 1a. The transparent unit allows light from the headlight 1a to pass through and advance forward from the vehicle 1. The transparent unit may be formed integrally with the light cover of the headlight 1a.

The display panel 2 does not necessarily need to include multiple display units 4. That is, the display panel 2 may include a single display unit 4 that is attached to substantially the entire front surface of the panel base 6 in the vehicle 1.

The panel base 6 of the display panel 2 does not necessarily need to be curved. In this case, the substrate 7 of each display unit 4 is flat in correspondence with the shape of the panel base 6. If the substrate 7 is a flat plate, the wiring pattern for energizing the LEDs 8 may 8 may be made by printed wiring.

In place of LED displays, liquid crystal displays may be employed as the display units 4.

It is not necessary to provide a clearance between the outer edges of the display units 4 adjacent to the ornament 5 and the outer periphery of the ornament 5.

The ornament 5 does not necessarily need to be surrounded by the display units 4. Instead, the outer edge of the ornament 5 may be partially adjacent to some of the display units 4.

The cover unit of the display panel does not necessarily need to be a decorated ornament.

The millimeter wave radar 3 and the display panel 2 may be provided at the rear end of the vehicle 1.

As external situation recognizing devices, at least one of an infrared sensor and a camera may be used in place of or in addition to the millimeter wave radar 3.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

The invention claimed is:

1. A display panel employed in a vehicle equipped with an external situation recognizing device that is configured to receive electromagnetic waves from outside to recognize an external situation, the external situation recognizing device being located at an end in a front-rear direction of the vehicle, wherein the display panel is provided at the end of the vehicle and extends in a direction intersecting with the front-rear direction of the vehicle, the display panel comprising:

at least one display unit that is configured to display an image; and a cover unit that is closer to an outside of the vehicle than the external situation recognizing device and is located at a position that corresponds to the external situation recognizing device, wherein the cover unit is configured to allow the external situation recognizing device to receive the electromagnetic waves from outside through the cover unit, and the at least one display unit includes a display unit that is adjacent to at least part of an outer edge of the cover unit.

2. The display panel according to claim 1, wherein the at least one display unit is arranged so as not to cover the cover unit.

3. The display panel according to claim 1, wherein the cover unit is surrounded by the display unit.

4. The display panel according to claim 1, wherein the cover unit includes an ornament.

* * * * *